US012724944B2

(12) United States Patent
De Weer

(10) Patent No.: US 12,724,944 B2
(45) Date of Patent: Sep. 1, 2026

(54) METHOD, SYSTEM, DEVICE FOR TOPOLOGY OPTIMIZATION, AND TOPOLOGY OPTIMIZED COMPONENT

(71) Applicant: Siemens Industry Software NV, Leuven (BE)

(72) Inventor: Tom De Weer, Leuven (BE)

(73) Assignee: Siemens Industry Software NV, Leuven (BE)

( * ) Notice: Subject to any disclaimer, the term of this patent is extended or adjusted under 35 U.S.C. 154(b) by 300 days.

(21) Appl. No.: 18/698,699

(22) PCT Filed: Mar. 8, 2022

(86) PCT No.: PCT/EP2022/055865
§ 371 (c)(1),
(2) Date: Apr. 4, 2024

(87) PCT Pub. No.: WO2023/061628
PCT Pub. Date: Apr. 20, 2023

(65) Prior Publication Data

US 2025/0005227 A1 Jan. 2, 2025

(30) Foreign Application Priority Data

Oct. 14, 2021 (EP) .................................... 21202662

(51) Int. Cl.
*G06F 30/20* (2020.01)
*G06F 113/10* (2020.01)

(52) U.S. Cl.
CPC .......... *G06F 30/20* (2020.01); *G06F 2113/10* (2020.01)

(58) Field of Classification Search
None
See application file for complete search history.

(56) References Cited

U.S. PATENT DOCUMENTS

2021/0216683 A1* 7/2021 Rai ....................... B29C 64/386
2021/0294943 A1 9/2021 Kang et al.

FOREIGN PATENT DOCUMENTS

WO 2020186829 A1 9/2020

OTHER PUBLICATIONS

PCT International Search Report and Written Opinion of International Searching Authority mailed Oct. 17, 2023, corresponding to PCT International Application No. PCT/EP2022/055865, pp. 1-14.

(Continued)

*Primary Examiner* — Carlos R Ortiz Rodriguez
(74) *Attorney, Agent, or Firm* — Lempia Summerfield Katz LLC

(57) ABSTRACT

A computer-implemented method for improving the topology of a component includes: providing a component load case including boundary conditions for the component; providing a starting component design; and segmenting the component design into unit cells. To obtain a component design with optimal topology, the method further includes generating a surrogate model that relates possible unit cell stiffness tensors and a unit cell average density to each other. For a given unit cell average density, variations of the unit cell stiffness tensor are parameterized by the surrogate model. The method further includes using the surrogate model for improving or optimizing at least one specific unit cell parameter for each unit cell towards an optimization target; and changing the component design by amending a material mass distribution according to optimizing results.

16 Claims, 4 Drawing Sheets

(56) References Cited

OTHER PUBLICATIONS

D. Mueller-Gritschneder et al., "A Successive Approach to Compute the Bounded Pareto Front of Practical Multiobjective Optimization Problems," Siam Journal on Optimization; vol. 20, 2009, pp. 915-934.
A. Ferrer et al., "Two-scale topology optimization in computational material design: An integrated approach. International Journal for Numerical Methods in Engineering," 114(3), Apr. 2018, pp. 232-254.
T. Djourachkovitch et al. "Multiscale topology optimization of 3D structures: A micro-architectured materials-database assisted strategy," Computers and Structures, 255:106574, 2021, pp. 1-14.
J. Wu et al., "Topology optimization of multi-scale structures: a review"; Structural and Multidisciplinary Optimi zation; Mar. 2021, pp. 1-26.

* cited by examiner

STL
STL
STL
STL
STL

HNL
IHO
$\min_{\rho} \sum (C^*_i - C_i)^2$
$\int_{\Omega} \rho d\Omega / V_{\Omega} \leq \rho_{max}$
STL

FIG 4

$J_1$ $J_2$ IJ1 IJ2 SOP SOP PRF POS UAT

FIG 5

STL CPT,CTV f $E = \Psi(w_{i,j}, \rho_{max})$

OPM
OPM,PFR
ρmax=1
ρmax=0
SGM,VAD=const.
Cxx
Cyy

METHOD, SYSTEM, DEVICE FOR TOPOLOGY OPTIMIZATION, AND TOPOLOGY OPTIMIZED COMPONENT

The present patent document is a § 371 nationalization of PCT Application Serial No. PCT/EP2022/055865, filed Mar. 8, 2022, designating the United States, and this patent document also claims the benefit of European Patent Application No. 21202662.9, filed Oct. 14, 2021, which are incorporated by reference in their entireties.

TECHNICAL FIELD

The disclosure relates to a method, to be performed on a computer, for improving the topology of a component, the method including: providing a component load case including boundary conditions for the component; providing a starting component design; and segmenting the component design into unit cells. Further, the disclosure relates to a system to carry out the method or for generating the component and to a component with optimized topology.

BACKGROUND

Topology optimization is a research field concerned with exploring a design space and deciding where to put material and, equally important, where not to. This allows designing complex, organic structures that would not result from a traditional optimization approach that aims to find the best parameters for a given model, since parametrization inherently limits the design space. Due to its complex designs, topology optimization forms a complementary technology pair with additive manufacturing (AM), which is capable of printing materials everywhere inside a 3D design space and thus enables the manufacturing of the complex/organic structures found by the topology optimization optimizer.

In other words, topology optimization is a method that optimizes material layout within a given design space, for a given set of loads, boundary conditions, and constraints with the goal of maximizing the performance of the system.

For this disclosure, the term optimal may be regarded in the mechanical sense, i.e., structures with a layout/design that results in the lowest compliance or mass under prescribed loads and boundary conditions. Due to the flexibility of the proposed framework, expansion to other fields of physics is possible. An improvement is an amendment from a current configuration towards an optimization target respectively an optimum as explained.

Multiscale topology optimization is concerned with finding optimal structures on multiple, (e.g., two), scales. This means in practice that two optimization loops are used. The outer loop is the standard monoscale topology optimization framework that decides the optimal amount of material at every point in the design. The inner loop looks at a single point and, through an assumption of scale separation, uses homogenization to decide the optimal microstructure at this point.

Topology optimization is a multiscale optimization method for finding: 1) an improved amount of material, (e.g., an optimal amount of material) at every point in the design space; and 2) the layout of the material distribution, e.g., for every single voxel, what this material should look like on the microscale.

Methods of topology optimization may be judged based on the three main challenges: efficiency, optimality, and manufacturability.

Efficiency is the easiest to judge but also the hardest to solve, since technically two-scale topology optimization requires a double optimization loop. Some methods severely reduce the microstructure design space to combat this problem or instead solve it in an offline phase.

Solving for each microstructure a full monoscale topology optimization in every iteration requires enormous computational effort. Literature after this has compromised optimality in favor of efficiency, mostly through parameterization of the microstructure and offline computations. Multiscale topology optimization methods may thus be judged on their optimality by looking at how severely the parametrization of their microstructures limits the design space. In this sense, monoscale TO methods are simply two-scale methods with a microstructure design space restricted to the density. The less parametrization, the more optimal the design may be (but at a higher cost).

Optimality respectively best improvement is one main advantage of this disclosure because the disclosure provides optimality without compromising efficiency.

U.S. Patent Application Publication No. 2021/0216683 A1 discloses a method for improving the topology of a component.

U.S. Patent Application Publication No. 2021/0294943 A1 relates to the field of topology optimization.

An overview of multiscale topology optimization algorithms is given by Wu et al. (J. Wu, O. Sigmund, and J. P. Groen, "Topology optimization of multi-scale structures: a review," Structural and Multidisciplinary Optimization, 2021).

Wu et al. proposes to divide algorithms into 5×3=15 categories based on the restrictions that are placed on the density and the set of admissible stiffness tensors for the homogenized microstructures. They are thus divided into how their microstructures are parameterized, and this parametrization has major effects on the three challenges/criterions explained above.

For the restriction on density, Wu et al. make a division between: 1) techniques that do not restrict it; 2) techniques that only allow a discrete set of densities; and 3) techniques that use a fixed density for the whole design domain.

As explained above, any restriction on density is suboptimal and it is one object of this disclosure to avoid this. Category 1) may therefore be a decent option for multiscale topology optimization.

With respect to the restrictions on the set of admissible stiffness tensor, Wu et al. divide all multiscale optimization methods into five types.

The first uses optimal sets of stiffness tensors, which correspond to the theoretically known rank-N laminates. The rank-n laminate includes alternating layers of the phase "-" and rank-(n−1) layers. Although these microstructures are provided to be optimal, they are not manufacturable because they exist on more than one scale.

The second type uses inverse homogenization: an optimization technique that tries to find microstructures with homogenized material properties that lie as close as possible to given, desired properties. It thus allows generating optimal microstructures without restrictions on their orientation, connectivity, etc. These methods thus provide very optimal designs but suffer from computational inefficiency.

The third type also uses inverse homogenization but puts some restrictions on the unit cell design. It is thus less optimal than the second type, but may be more manufacturable.

The fourth and fifth type use unit cells parameterized with multiple parameters or simply the density, respectively. An example of the fourth type includes microstructures restricted to lattices where the beam diameters are used as parameters. In case all beam diameters are constrained to be equal, only one parameter (e.g., the beam diameter/relative density) remains and the method then belongs to the fifth type. Due to the aggressive parametrization, the resulting designs are provided to be suboptimal.

Although not covered by Wu et al., an important variation on the second type exists, namely the database- or Vademecum-enhanced methods from Ferrer et al., "Two-scale topology optimization in computational material design: An integrated approach," International Journal for Numerical Methods in Engineering, 114 (3): 232-254, April 2018; and Djourachkovitch et al., "Multiscale topology optimization of 3D structures: A micro-architectured materials-database assisted strategy," Computers and Structures, 255:106574, 2021.

Basically, instead of doing the microscale optimization loop online, causing computational inefficiency, a lot of microstructures are optimized offline. These optimized solutions are stored in a database (referred to as a Vademecum by Ferrer et al.) and used during the macroscale optimization procedure. As such, the large online cost is replaced by an offline cost. Furthermore, costly re-computation of previously optimized structures is prevented. These solutions may thus be regarded as the state of the art, but currently they lack the final insight that unlocks their true capabilities. This final insight, namely that all optimal microstructures lie on a Pareto front, is explained in the next section. The remaining part of this section discusses first the works of Ferrer et al. and second the paper of Djourachkovitch et al. and focusses on how their formulations limit the design space.

First, Ferrer et al. propose a 'Vademecum-based' approach to multiscale topology optimization. A Vademecum of optimal microstructures is computed and used in the macroscale optimization loop. A large restriction is immediately placed on the optimal microstructures: they all have the same relative density (e.g., 60%). Furthermore, because a Vademecum is a point cloud without structure, the macroscale algorithm simply loops through all entries and selects the best. This is moderately efficient and results in only a zeroth order approximation of the Pareto front that the Vademecum point cloud represents. With respect to manufacturability, Ferrer et al. propose a way to add manufacturing constraints by severely restricting their design space. In conclusion, severe restrictions are placed on optimality and manufacturability in order to provide computational efficiency.

Second, Djourachkovitch et al. also propose a database-assisted strategy, although another inverse homogenization formulation is used. Although the microstructure's relative density is allowed to change, the microstructure layout is kept fixed everywhere in design space. This restriction is at least equally restrictive, if not more, than fixing the microstructure density but allowing it to change over the design domain. The main advantage of this technique is the manufacturability, which is severely improved when only a single microstructure exists. Since a database is used, optimal structures are again interpreted as a point cloud, which has severe complications for the method: a zeroth order algorithm is again used (since a database is non-smooth) and optimality is lost since the database, although large, is limited in size.

SUMMARY

It is an object of the disclosure to overcome or mitigate the problems identified with the prior art as explained above.

The scope of the present disclosure is defined solely by the appended claims and is not affected to any degree by the statements within this summary. The present embodiments may obviate one or more of the drawbacks or limitations in the related art.

To obtain a component design with optimal topology most efficiently and proximate to optimality, the disclosure proposes a method that includes generating a surrogate model that relates these quantities to each other: possible unit cell stiffness tensors, and a unit cell average density, wherein for a given unit cell average density variations of the unit cell stiffness tensor are parameterized by the surrogate model. The method further includes using the surrogate model for improving or optimizing at least one specific unit cell parameter for each unit cell towards an optimization target. The method further includes changing the component design by amending a material mass distribution according to the improving or optimizing results.

The disclosure solves the material design problem by using a surrogate model relating cell stiffness tensors to a unit cell average density. This surrogate model may apply parameters corresponding to the degree of freedom of the underlying physical problem respectively the cell stiffness tensor. For homogenization to. e.g., anisotropic materials, at most 21 parameters are required to parametrize the cell stiffness tensors.

One embodiment provides that elements of the stiffness tensor, (e.g., all of them), are improved or optimized. This results in a multiple objective improvement, and thus the formulation is a multi-objective optimization problem. This formulation to improve the stiffness tensor E may be written in a more simplified way as:

$$\max_{\rho} E_{1,1}, E_{1,2}, E_{1,3}, \ldots, E_{6,6}$$

This formulation may be applied for optimizing the complete stiffness tensor respectively all its components at once (the constraints may be unchanged). This optimization problem has more than one objective and may consequently result in several solutions. Each of these solutions lies on a Pareto frontier. Specifying the importance of the objectives reduces the solution space significantly and may even lead to a single solution if the importance of each of your objectives is specified. One possibility to set a suitable optimization target is obtained by assigning an importance weight as a factor to each one of the tensor elements. This assignment may be combined with summing up all the weighted elements in order to maximize this sum. This beneficial approach scalarizes the optimization target changing the problem from multiple objectives to a single objective. This scaling and adding may be formulated as:

$$\operatorname{Max}_{\rho} w_{1,1}E_{1,1} + w_{1,2}E_{1,2} + w_{1,3}E_{1,3} + \ldots + w_{6,6}E_{6,6}$$

This process successfully improves the stiffness tensor elements in case that these are strictly convex. In case the stiffness tensor optimizing problem doesn't behave convexly the optimization may be performed by a suitable algorithm for multi-objective optimization, e.g., known from Mueller and Gritschneder, "A Successive Approach to Compute the Bounded Pareto Front of Practical Multiobjective Optimization Problems," SIAM Journal on Optimization, 20, 2009, pp. 915-934.

According to an embodiment, an optimization may apply an algorithm that finds points of the Pareto front. Specifically, a suitable algorithms may explore a map from the importance weight vector $w=[w_{1,1}, w_{1,2}, \ldots, w_{6,6}]$ (which specifies how important each objective is) to the corresponding performance vector f (in this case the stiffness tensor $f=[E_{1,1}, E_{1,2}, \ldots, E_{6,6}]$).

The parametrization of the stiffness tensor using the surrogate model by the importance weights $w_{i,j}$ may be done for only every independent element $$E^H_{i,j}$$

in the homogenized stiffness tensor. The parametrization may have the advantage of improved stability over specifying a set of desired material parameters, which may be unattainable. For homogenization to anisotropic materials, at most 21 weights are required to parametrize the homogenized stiffness tensor. These weights including a cell average density may be called hyperparameters of the surrogate model. The importance weights $w_{i,j}$ may lie between 0 and 1 and sum to 1:

$$0 \leq w_{i,j} \leq 1 \forall\, i, j \,\&\, \sum_{i,j} w_{i,j} = 1.$$

The following formulation may then be obtained.

$$\underset{\rho}{\text{Max}} \sum_{i,j} w_{i,j} E^H_{i,j}$$

wherein this formulation is subject to constraints:
1) Hooke's law (f=force, u=displacement, K=stiffness):

$$Ku^i = f^i,\ i = 1 \ldots 6$$

2) Unit cell average density below the maximum unit cell average density ($\rho_{max}$):

$$\int \rho d\Omega / V_\Omega \leq \rho_{max}$$

3) Weighting-parameters: $0 \leq w_{i,j} \leq 1$

Here, the optimization variable ρ is the standard microscopic density distribution inside a unit cell. This density distribution is used to maximize the objective function, a weighted sum of the elements of the homogenized stiffness tensor $E^H$ This homogenized stiffness tensor $E^H$ is found by solving a standard homogenization procedure, which includes solving the six boundary value problems corresponding to constraint 1) (solid state mechanics; mechanical force equilibrium).

Constraints 2) and 3) are volume and density constraints, which may also be applied in monoscale topology optimization. Additional connectivity and manufacturability constraints may be added. Connectivity and manufacturability may be guaranteed by constraining the unit cell layout design library Vademecum to layouts which fulfill these requirements.

An embodiment provides that providing a starting component design specifies at least one of the following parameters: providing maximum component geometry boundaries and/or providing a material mass distribution.

Another embodiment provides segmenting the component design into unit cells with the further act of: assigning to each unit cell based on the component design unit cell parameters at least one of: a unit cell geometry; a unit cell load case including unit cell boundary conditions; a unit cell average density; or a unit cell stiffness tensor.

Some of these quantities relating to solid state mechanics may be derived from the macroscale mechanical equilibrium (unit cell stiffness tensor, load case) and other may be set to an average value. FEM may be used to determine some of these quantities in more complex cases.

An embodiment further provides generating the surrogate model applying the acts of: providing at least two standard layouts for the unit cells; and generating the surrogate model on basis of the standard layouts provided, wherein the surrogate model relates the following quantities to each other: the unit cell stiffness tensor; the unit cell average density; and weighting-parameters.

The weighting-parameters may be provided for every independent element of the unit cell stiffness tensor, such that for a given unit cell average density variations of the unit cell stiffness tensor are parameterized by the weighting-parameters.

Another embodiment provides improving or optimizing at least one specific unit cell parameter using the surrogate model. This process may further include: defining a maximum unit cell average density for each unit cell; keeping the unit cell average density below the maximum unit cell average density; and keeping the sum of the weighting-parameters constant.

Such improving may be done for all unit cells. For each unit cell, an optimal weighting parameter set may be determined resulting in a stiffness tensor which may be converted to a standard layout by inverse homogenization.

Another embodiment provides changing the component design by amending the material mass distribution according to optimizing results such that: the unit cell average density is increased for unit cells with lower proximity to the optimization target; and the unit cell average density is decreased for unit cells with higher proximity to the optimization target.

The re-distribution of the mass all over the component unit cells depending on their respective performance regarding the stiffness tensor efficiently leads the design process towards an optimum of mass distribution and microscale layout.

An embodiment provides that the standard layouts for the unit cells are characterized by the lowest compliance for a given average density under the unit cell load case or the lowest average density for a given compliance under the unit cell load case.

This preselection of optimal layouts increases the efficiency of the process significantly.

An embodiment provides that the surrogate model is configured such that it models the unit cell stiffness tensor for respectively predefined unit cell average densities as being located on a Pareto-front when keeping the sum of the weighting-parameters constant. The proposed technique solves the multiscale topology optimization problem using a surrogate model of microstructures lying on a Pareto front.

This idea of applying Pareto optimality overcomes issues of conventional multiscale topology optimization technique in particular regarding the challenge of optimality. Parametrizing the microstructure in any way may sacrifice optimality due to not providing the full design space of possible microstructures. The disclosure solves this problem by a logical restriction, requiring that the employed microstructures are optimal "in some sense." When the optimizing target is mass reduction or least density the principle may be named as "do less with more." The proposed method follows such rule as: if a microstructure A may be replaced by another microstructure B that uses less material, then microstructure A is sub-optimal. By repeating this process, only "optimal" microstructures are retained.

The theory surrounding Pareto efficiency is known from economic theory and philosophy. The act of replacing microstructure A by B is called a "Pareto improvement" and by continuously doing so (through optimization routines) a "Pareto Optimal," here a microstructure is obtained. The set of all Pareto optimal solutions is referred to as the "Pareto front (ier)."

The restriction that microstructures lie on a Pareto front is one understanding enabling efficiency. All conventional multiscale frameworks that employ inverse homogenization (also known as material design) generate microstructures. So far not realized is that these microstructures may be located on a Pareto front. Applying this understanding now enables using the surrogate model for optimizing allowing flexibility, efficiency, and manufacturability.

For every choice of the so-called "hyperparameters," (e.g., the maximum relative density $\rho_{max}$ and the "importance weights" $w_{i,j}$), another Pareto optimal material or structure or microstructure may be obtained. By varying the hyperparameters, one may thus 'trace' the Pareto front, effectively obtaining a map to all "useful" microstructures. To decide which Pareto optimal microstructure is employed at every region k on the macroscale, the disclosure optimizes the hyperparameters $$\rho_{max}^k \text{ and } w_{i,j}^k$$

for every such region. Mathematically, given N macroscale regions, the following (discrete form of the) macroscale optimization problem is then solved. This process does not provide that the material-specification or exact layout, (i.e., what your metamaterial looks like) is the output of the surrogate model optimizing process. The exact layout, (i.e., what your metamaterial looks like) is obtained after the improving or optimizing act using inverse homogenization. The surrogate merely model maps the compromise weights (one for every stiffness tensor element, so at most 21) and the desired weight of the (meta-) material to the (compromise) stiffness tensor of the optimal metamaterial with that weight. In that sense, the surrogate model contains the information "what could be achieved" but not (yet) "how do we achieve that."

An embodiment of provides the optimization target is one of: reducing the cell average density and/or increasing the weighted sum of the elements of the unit cell stiffness tensor and/or reducing the compliance of the unit cell under the unit cell load case.

Different design tasks or technical disciplines may be better achieved by a specific optimization objective than with others. For example, reducing the compliance of the unit cell under the unit cell load case may be done as:

$$\min_{\rho_{max}^k, w_{i,j}^k, k=1,\ldots,N} u^T f$$

wherein this formulation is subject to constraints:

1) Hooke's law (f=force, u=displacement, K=stiffness):

$$K(w_{i,j}^k, \rho_{max}^k)u = f$$

2) Unit cell average density below the maximum unit cell average density:

$$\sum_k \rho_{max}^k V^k / V_{tot} \le P_{max}$$

3) Weighting-parameters:

$$0 \le w_{i,j}^k \le 1 \;\&\; \sum_{i,j} w_{i,j}^k = 1 \;\&\; 0 \le \rho_{max}^k \le 1 \forall\, i, j, k$$

Here, the objective function is the compliance, which depends indirectly on the optimization variables $$w_{i,j}^k \text{ and } \rho_{max}^k$$

through the displacement u and the state equation (=>constraint 1)). Constraint 2) reflects the macroscale volume constrained by the maximum macroscale relative density $\rho_{max}$. Finally, constraint 3) contains the microscale hyperparameter constraints.

Due to the above formulations, two-scale optimality is guaranteed. Since microstructures are not parametrized or restricted in any way, the complete design space may be employed. The understanding that the Pareto front is a smooth function of the hyperparameters, allows these hyperparameters to be used as macroscale optimization variables: something unseen in current literature that allows flexibility in optimization solvers, adding extra constraints, expansion to other physics.

Due to the concurrent solving of N inverse homogenization problems in each macroscale iteration computational resources are needed. A key element to provided efficiency is a surrogate model $\Psi$. This surrogate model may be a neural network, kriging interpolation scheme, or any other suitable model type that may map the hyperparameters to their corresponding Pareto optimal stiffness tensor. It may be noted that the optimal microstructural density distribution $\rho$ is not used for the surrogate model, since inverse homogenization suffers from a uniqueness problem: multiple microstructural densities may have the same homogenized properties. The surrogate model's output is a stiffness tensor of the optimal metamaterial. This means that, after the final iteration has occurred and the optimal hyperparameters are found, one single inverse homogenization problem is solved for every region in order to extract the optimal CAD model:

$$\Psi(w_{i,j}, \rho_{max}) = E_{Pareto}.$$

This is one key feature to combine optimality and efficiency.

The surrogate may be trained on sampled points of the pareto front and provides an accurate, efficient, and differentiable map Ψ from the hyperparameters to the optimal stiffness tensor $E_{opt}$. This means it also may provide a complete representation of all the microstructural tradeoffs, i.e., it may support to answer questions like: "How much stiffness is lost when decreasing the relative density?" or "How can the stiffness in the x direction be improved without jeopardizing the y and z stiffness?"

This understanding may be useful for an engineer to find the best design.

Compared to the conventional zeroth order database selection strategies (e.g., Ferrer et al. and Djourachkovitch et al.) this approach and its variations provide a considerable improvement. This benefit is enabled by the realization that inversely homogenized points lie on a Pareto frontier.

Another embodiment provides flexibility of the proposed methodology and allows for manufacturability. By adding manufacturing constraints containing hyperparameters such as a maximum length scale or connectivity parameters to the microscale formulation, manufacturing constraints may be provided in a flexible way. The disclosure offers flexibility with respect to manufacturing. Another point of flexibility is the employed physics. Although here the linear elastic problem is solved, one may straightforwardly apply the disclosure to, for example, fluid flow problems by envisioning a class of Pareto optimal microstructures that optimally guide fluids given a certain pressure field.

The disclosure may benefit from the understanding that inversely homogenized microstructures lie on a Pareto frontier, and that this frontier may be parametrized using the inverse homogenization's hyperparameters. The inverse homogenization is thus changed slightly, using importance weights instead of desired material properties, leading to a unique new material design formulation. The realization of Pareto optimality, together with the hyperparameter parametrization, then lead to a unique macroscale formulation where the hyperparameters are optimized. This framework thus provides complete macro- and micro-scale optimality, a very important criterion. Furthermore, the realization also enables a feature of the disclosure: a (smooth) surrogate model that allows efficient online evaluation of the material design formulation. The disclosure's flexibility also allows the easy adoption of extra manufacturability constraints and expansion to other physics.

BRIEF DESCRIPTION OF THE DRAWINGS

Embodiments are now described, by way of example only, with reference to the accompanying drawings, of which:

FIG. 4 depicts an example of a visualization of the Pareto front for minimization of two objectives.

FIG. 5 depicts an example of an overview illustrating a relation between microscale standard layouts, the surrogate model and the component design and load case.

The illustration in the drawings is in schematic form. In the Figures, like reference numerals designate like or functionally equivalent elements, unless otherwise indicated.

DETAILED DESCRIPTION

Figure 1:
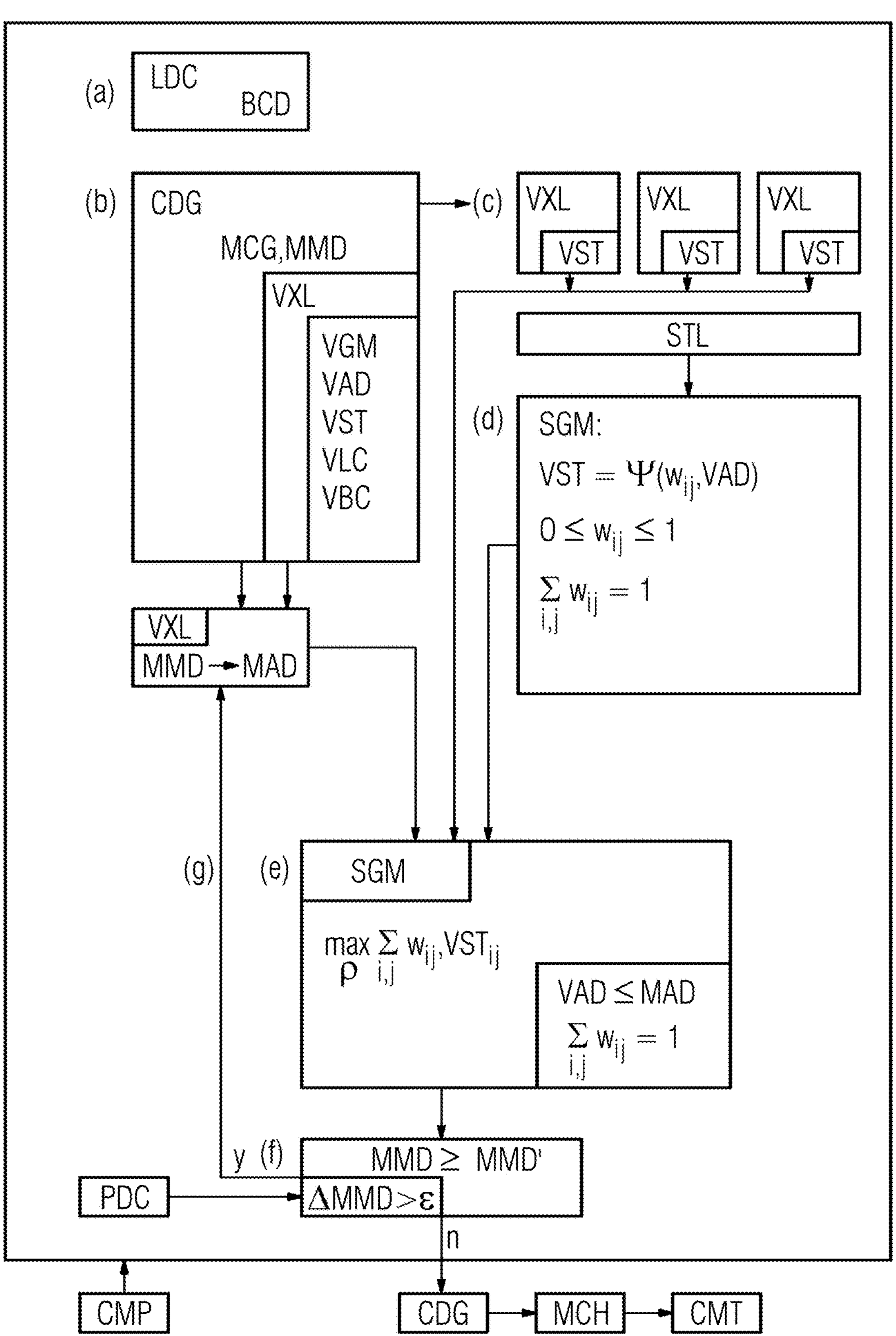
FIG. 1 depicts a flow diagram of an example of a method.

FIG. 1 shows a simplified flow diagram illustrating a method for improving the topology of a component CPT. Act (a) provides a component CPT load case LDC including boundary conditions BCD for the component CPT. Such component may be understood as a real-world object as the cantilever CTV shown in FIG. 5. As an input to the process, act (b) provides a starting component design CDG. This design may include unit cell parameters VXP such as a unit cell geometry VGM, a unit cell load case VLC including unit cell boundary conditions VBC, a unit cell average density VAD, or a unit cell stiffness tensor VST.

The initial component design CDG is used for segmenting the component design CDG into unit cells VXL in act (c).

In act (d), based on unit cell VXL standard layouts and their respective properties (homogenized unit cell stiffness tensor VST, unit cell average density VAD), a surrogate model SGM that relates these quantities to each other is generated. The standard layouts STL are characterized by the lowest compliance CPL for a given average density VAD under the unit cell load case VLC or the lowest average density VAD for a given compliance CPL under the unit cell load case VLC.

The surrogate model SGM parameterizes for a given unit cell average density VAD variations of the unit cell stiffness tensor VST.

In an act (e), the surrogate model SGM is used for improving or optimizing at least one specific unit cell parameter VXP for each unit cell VXL towards an optimization target OTG. The optimization target OTG may be reducing the cell average density VAD, increasing the weighted sum of the elements of the unit cell stiffness tensor VST, reducing the compliance of the unit cell VXL under the unit cell load case VLC, or a combination thereof.

In act (f), the component design CDG is changed by amending (MMD=>MMD') a material mass distribution MMD according to optimizing results of act (e). This may be done according to the following rules: the unit cell average density VAD is increased for unit cells VXL with lower proximity to the optimization target OTG, and the unit cell average density VAD is decreased for unit cells VXL with higher proximity to the optimization target OTG.

In act (g), acts (e) and (f) may be repeated until a predefined criterium PDC is met. The criterium PDC may be that the change rate (change per loop) decreases below a certain threshold (DMMD<ε).

According to the improved or optimized design CDG, a topology optimized component CMT may be machined MCH, e.g., by additive manufacturing resp. by a 3D-printing apparatus.

Figures 2, 3:
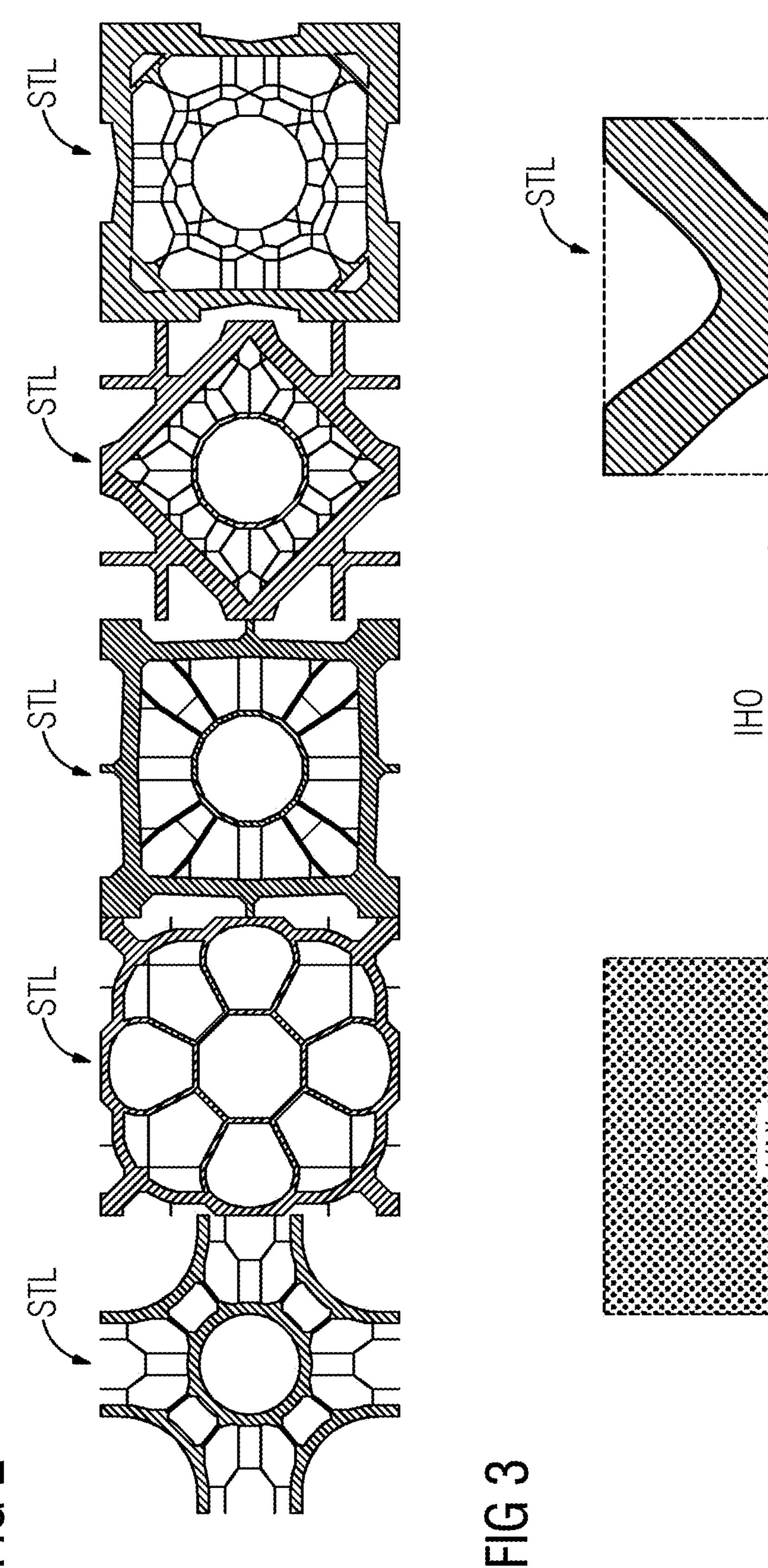
FIG. 2 depicts examples of microscale standard layouts for the unit cells.
FIG. 3 depicts an example of a simplified schematic illustration of inverse homogenization.

FIG. 2 shows five neighboring standard layouts STL respectively microstructures. The standard layouts STL of this example are optimized without considering their connectivity. Connectivity constrains may be made to provide manufacturability.

FIG. 3 shows an illustration of the inverse homogenization IHO, solving a material design problem. On the left-hand side, a homogenized microstructure HNL with unknown layout is symbolized. This homogenized microstructure HNL has desired microstructure properties relating to average density/volume ratio and stiffness behavior. Via inverse homogenization IHO a specific layout is determined providing the desired properties.

Figures 4, 5:
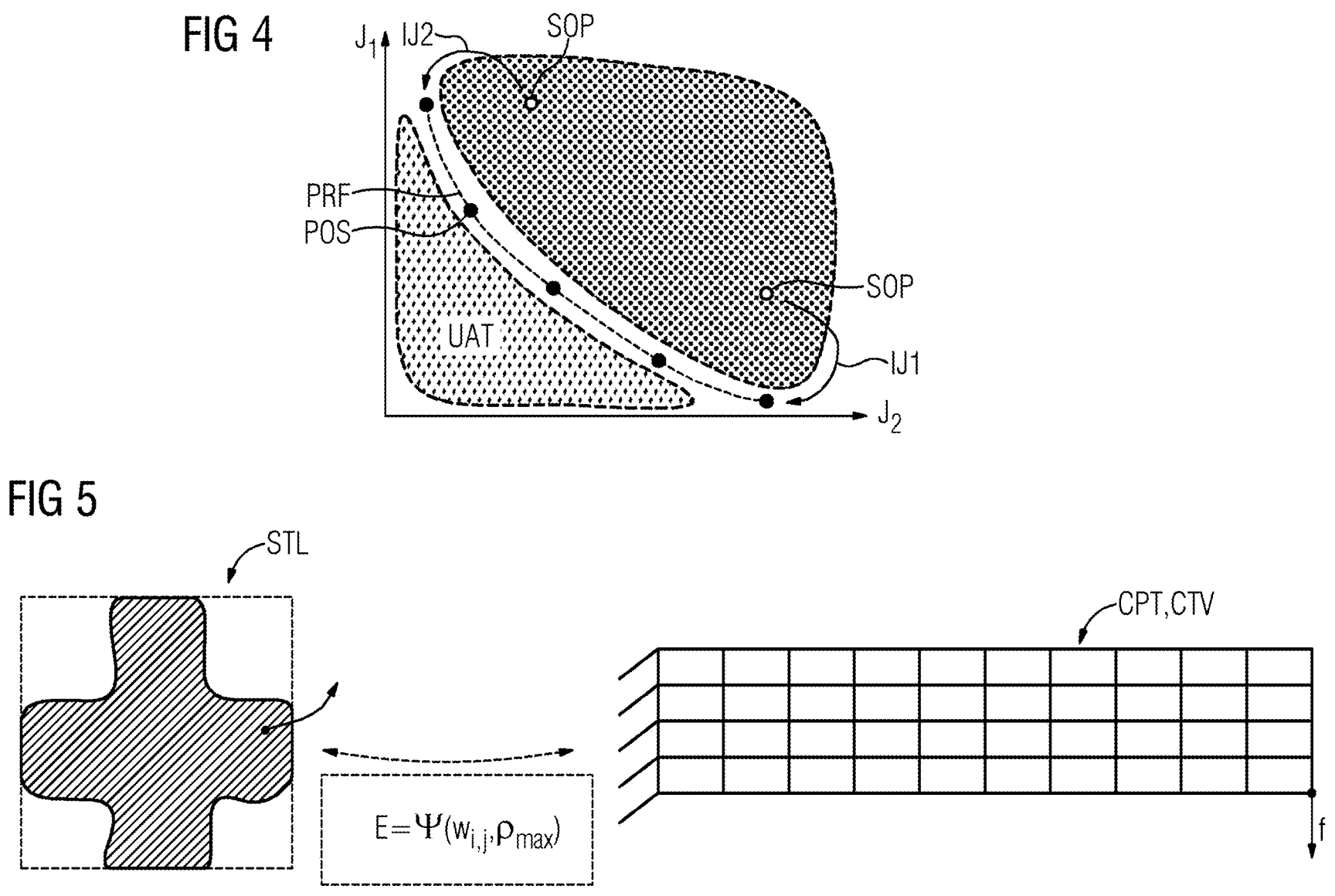

FIG. 4 shows a visualization of a Pareto front PRF for minimization of two objectives J1,J2. The Pareto front PRF is the location of Pareto-optimal solutions POS. Finding points on the front, called Pareto Front tracing, is numerically expensive due to the need for an iterative optimization routine. The Pareto front PRF divides areas of solutions which are unattainable UAT from sub-optimal solutions SOP. The figure illustrates two improvements: IJ2 is an improvement of objective J2 without compromising objective J1, and IJ1 is an improvement of objective J1 without compromising objective J2.

FIG. 5 illustates an overview of a possible framework.

The disclosure solves the material design problem by generating and applying a surrogate model $E=\Psi(w_{i,j}, \rho_{max})$ which is mapping model hyperparameters wij and maximum density πmax to optimize the stiffness tensor. Instead of specifying a set of desired material parameters, which may lead to instability when these are unattainable, the importance weight $w_{i,j}$ for every independent element $$E^H_{i,j}$$

in the homogenized stiffness tensor is specified. For homogenization to anisotropic materials, at most 21 weights are required. They lie between 0 and 1 and they are required to sum to 1:

$$0 \le w_{i,j} \le 1 \forall\, i, j \;\&\; \sum_{i,j} w_{i,j} = 1.$$

The following formulation is then obtained:

$$\max_{\rho} \sum_{i,j} w_{i,j} E^H_{i,j}$$

Subject to:

$$Ku^i = f^i,\ i = 1 \ldots 6 \qquad 1)$$

$$\int \rho d\Omega / V_\Omega \le \rho_{max} \qquad 2)$$

$$0 \le \rho \le 1 \qquad 3)$$

Here, the optimization variable ρ is the standard microscopic density distribution inside a unit cell. This density distribution is used to maximize the objective function, a weighted sum of the elements of the homogenized stiffness tensor E. This tensor is found by solving a standard homogenization procedure, which includes solving the six boundary value problems corresponding to constraint 1). Constraint 2) and 3) are standard volume and density constraints similar to those found in monoscale TO.

Figure 6:
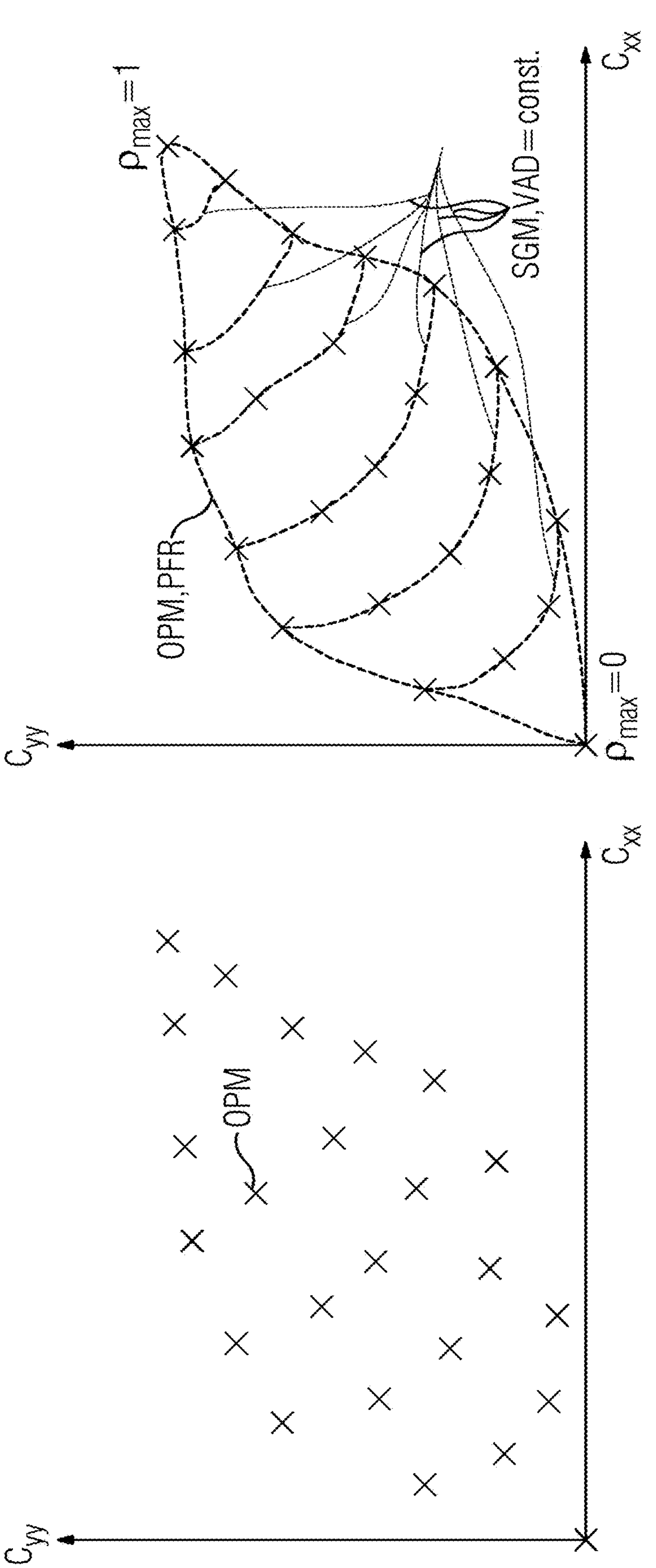
FIG. 6 depicts an example of a simplified schematic illustration of Pareto frontiers of the surrogate model.

FIG. 6 shows an illustration of a point cloud of optimal microstructures OPM (left) and their interpretation as a Pareto front surrogate model SGM) right) showing the lines of constant average density VAD. The field of different optimal microstructures OPM varying the two objectives Cxx, Cyy is the Pareto frontier PFR of optimal microstructures OPM.

It is to be understood that the elements and features recited in the appended claims may be combined in different ways to produce new claims that likewise fall within the scope of the present disclosure. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A computer-implemented method for improving a topology of a component, the method comprising:
providing a component load case including boundary conditions for the component;
providing a starting component design;
segmenting the component design into unit cells;
generating a surrogate model that relates possible unit cell stiffness tensors and a unit cell average density to each other, wherein for a given unit cell average density, variations of a unit cell stiffness tensor are parameterized by the surrogate model;
using the surrogate model for improving or optimizing at least one specific unit cell parameter for each unit cell towards an optimization target; and
changing the component design by amending a material mass distribution according to results of the improving or the optimizing of the at least one specific unit cell parameter for each unit cell.

2. The computer-implemented method of claim 1, wherein the providing of the starting component design specifies providing maximum component geometry boundaries, providing the material mass distribution, or a combination thereof.

3. The computer-implemented method of claim 1, wherein the segmenting of the component design comprises:
assigning to each unit cell, based on the component design, unit cell parameters of: a unit cell geometry, a unit cell load case including unit cell boundary conditions, the unit cell average density, a unit cell stiffness tensor, or a combination thereof.

4. The computer-implemented method of claim 1, wherein the generating of the surrogate model comprises:
providing at least two standard layouts for the unit cells; and
generating the surrogate model based on the at least two standard layouts,
wherein the surrogate model relates the following quantities to each other: the unit cell stiffness tensor, the unit cell average density, and weighting-parameters, and
wherein the weighting-parameters are provided for every independent element of the unit cell stiffness tensor, such that, for the given unit cell average density, the variations of the unit cell stiffness tensor are parameterized by the weighting-parameters.

5. The computer-implemented method of claim 1, wherein the improving or the optimizing of the at least one specific unit cell parameter using the surrogate model further comprises:
defining a maximum unit cell average density for each unit cell;
keeping the unit cell average density below the maximum unit cell average density; and
keeping a sum of weighting-parameters constant.

6. The computer-implemented method of claim 1, wherein the changing of the component design is performed such that:

the unit cell average density is increased for unit cells with lower proximity to the optimization target; and the unit cell average density is decreased for unit cells with higher proximity to the optimization target.

7. The computer-implemented method of claim 4, wherein the at least two standard layouts for the unit cells are characterized by:

a lowest compliance for a given average density under a unit cell load case; or a lowest average density for a given compliance under a unit cell load case.

8. The computer-implemented method of claim 1, wherein the surrogate model is configured such that the surrogate model models the unit cell stiffness tensor for respectively predefined unit cell average densities as being located on a Pareto-front when keeping a sum of weighting-parameters constant.

9. The computer-implemented method of claim 1, wherein the optimization target comprises reducing the unit cell average density, increasing a weighted sum of elements of the unit cell stiffness tensor, reducing a compliance of the unit cell under a unit cell load case, or a combination thereof.

10. The computer-implemented method of claim 1, further comprising:

repeating the using of the surrogate model and the changing of the component design until a predefined criterium is met.

11. The computer-implemented method of claim 1, wherein the starting component design further specifies: a starting geometry, a starting material mass distribution, a starting stiffness behavior under the component load case, or a combination thereof.

12. The computer-implemented method of claim 1, wherein the unit cell stiffness tensor is a homogenized unit cell stiffness tensor.

13. The computer-implemented method of claim 1, further comprising:

deleting unit cells with a resulting unit cell average density below a density-threshold, a resulting homogenized unit cell stiffness tensor below a unit cell stiffness tensor threshold, or a combination thereof; and amending component geometry boundaries according to the deletion of the unit cells.

14. The computer-implemented method of claim 1, further comprising:

generating the component according to the improved topology by an additive manufacturing process or 3D printing for printing the component.

15. A system comprising:

at least one computer configured to:

provide a component load case including boundary conditions for a component;

provide a starting component design;

segment the component design into unit cells;

generate a surrogate model that relates possible unit cell stiffness tensors and a unit cell average density to each other, wherein for a given unit cell average density, variations of a unit cell stiffness tensor are parameterized by the surrogate model;

use the surrogate model for improving or optimizing at least one specific unit cell parameter for each unit cell towards an optimization target; and change the component design by amending a material mass distribution according to results of the improving or the optimizing of the at least one specific unit cell parameter for each unit cell.

16. The system of claim 15, further comprising:

a 3D-printing apparatus configured to generate the component according to an improved topology by an additive manufacturing process or 3D printing for printing the component.

* * * * *